United States Patent [19]

Statz

[11] Patent Number: 4,742,107

[45] Date of Patent: May 3, 1988

[54] NOISE REDUCTION AND DAMPING COMPOSITIONS

[75] Inventor: Robert J. Statz, Kennett Square, Pa.

[73] Assignee: E. I. Du Pont de Nemours and Company, Wilmington, Del.

[21] Appl. No.: 46,536

[22] Filed: May 6, 1987

[51] Int. Cl.$^4$ .......................... C08K 3/34; C08L 27/00
[52] U.S. Cl. ..................... 524/449; 524/425; 524/451; 524/502; 524/524
[58] Field of Search ........................................ 524/449

[56] References Cited

U.S. PATENT DOCUMENTS

| | | | |
|---|---|---|---|
| 3,994,845 | 11/1976 | Blachford | 524/449 |
| 4,237,176 | 12/1980 | Brueggemann et al. | 524/449 |
| 4,325,858 | 4/1982 | Saito et al. | 524/449 |
| 4,412,103 | 10/1983 | Fujii et al. | 524/449 |
| 4,613,533 | 9/1986 | Loomis et al. | 524/445 |
| 4,623,586 | 11/1986 | Umeya et al. | 524/493 |
| 4,650,818 | 3/1987 | Oka et al. | 524/449 |

FOREIGN PATENT DOCUMENTS

| | | | |
|---|---|---|---|
| 0141230 | 8/1983 | Japan | 524/449 |
| 58-142923 | 8/1983 | Japan | . |
| 58-206660 | 12/1983 | Japan | . |
| 0186552 | 9/1985 | Japan | 524/449 |
| 1162530 | 6/1986 | Japan | 524/449 |
| 2056474 | 3/1981 | United Kingdom | 524/449 |

OTHER PUBLICATIONS

Derwent Abs. 83-779397/40 J58142923 Aug. 1983.

*Primary Examiner*—Herbert J. Lilling

[57] ABSTRACT

A blend of a copolymer of ethylene and at least one other organic monomer X capable of being polymerized to a homopolymer having a glass transition temperature of less than about $-20°$ C. with a homopolymer or copolymer of vinyl chloride, filled with mica, which constitutes about 20–90% of the total weight of the composition, is suitable for the manufacture of noise reduction or vibration damping articles. These compositions are especially suitable for continuous use under harsh environmental conditions, for example, at high temperatures as well as at subzero °C. temperatures.

20 Claims, No Drawings

NOISE REDUCTION AND DAMPING COMPOSITIONS

BACKGROUND OF THE INVENTION

This invention relates to noise reduction and vibration damping compositions based on blends of certain ethylene polymers with a vinyl chloride polymer and with mica.

Noise reduction and vibration damping compositions based on various polymers or polymer blends with inorganic fillers such as, for example, barium sulfate, calcium carbonate, lead salts, and even mica are known. Especially see Japanese patent applications (Kokai) Nos. 58-141230, 58-124923 (both Dainihon Ink Chemical Company), and 58-206660 (Sumitomo Chemical Company) as representative of such art. They can be used in numerous applications, including automobile carpets, plant motor enclosures, building soundproofing panels, etc. Depending on their intended use, such compositions may have to meet certain special performance requirements, such as. e.g., fabricability into sheets or panels and flexibility of such fabricated articles within particular temperature ranges, in addition to providing satisfactory noise reduction and vibration damping. For example, soundproofing mats for automotive use, which are placed in the engine compartment or under the hood of an automobile must be able to withstand high temperatures for prolonged periods without suffering heat-caused deterioration. They also must be able to withstand temperatures such as may be encountered in winter in cold climate when the automobile is parked outdoors for a prolonged period. While some of the currently used commercial products provide adequate performance within reasonable temperature ranges, they are not suitable for application in continuous use under harsh environmental conditions. New, improved compositions are therefore sought for such use.

SUMMARY OF THE INVENTION

According to the present invention, there is now provided a composition suitable for the manufacture of noise reduction or vibration damping articles, said composition consisting essentially of a blend of (a) about 10–90% of a copolymer of ethylene with at least one organic monomer X capable of being polymerized to a homopolymer having a glass transition temperature, $T_g$, of less than about $-20°$ C. and selected from the group consisting of esters of unsaturated $C_3$–$C_{20}$ mono- and dicarboxylic acids, vinyl esters of saturated $C_2$–$C_{18}$ carboxylic acids, and vinyl alkyl ethers wherein the alkyl group has 1–18 carbon atoms, and an additional monomer Y selected from the group consisting of ethylenically unsaturated $C_3$–$C_{20}$ carboxylic acids, carbon monoxide, and sulfur dioxide;

(b) about 90–10% of a vinyl chloride homopolymer or a copolymer of vinyl chloride with another ethylenically unsaturated comonomer selected from the group consisting of $C_2$–$C_5$ hydrocarbons, vinyl esters, acrylonitrile, acrylic esters, vinylidene chloride, esters of unsaturated carboxylic acids, and vinyl ethers;

both percentages being based on the total weight of the polymers in the blend, which is about 10–80% of the total weight of the composition; and (c) about 20–90% of mica, based on the total weight of the composition.

DETAILED DESCRIPTION OF THE INVENTION

Generally speaking, the ethylene copolymer should have such proportions of its comonomers that it can form an optically transparent blend with the vinyl chloride polymer. In such optically transparent blends, the blend polymers are compatible and form a solution in each other. The range of comonomer X thus normally will be about 1–60% of the weight of the ethylene copolymer, preferably 5–60%, and especially 5–50%. The range of comonomer Y will be within a range of about 1–30% of the weight of the ethylene polymer, preferably 3–30%, and especially 3–10%.

The comonomer X usually is referred to as the softening comonomer. Representative softening comonomers include n-butyl acrylate, sec-butyl acrylate, ethyl acrylate, hexyl acrylate, pentyl acrylate, n-octyl acrylate, 2-ethylhexyl acrylate, 2-methoxyethyl acrylate, vinyl acetate, vinyl propionate, vinyl hexanoate, ethyl vinyl ether, propyl vinyl ether, butyl vinyl ether, hexyl vinyl ether, 2-ethylhexyl vinyl ether, and methoxyethyl vinyl ether. The preferred softening comonomers are n-butyl acrylate, 2-ethylhexyl acrylate, 2-methoxyethyl acrylate, butyl vinyl ether, and hexyl vinyl ether, but especially n-butyl acrylate.

Representative $C_3$–$C_{20}$ unsaturated carboxylic acids that may constitute monomer Y which can be copolymerized with ethylene are acrylic, methacrylic, monoesterified maleic, preferably methacrylic and acrylic acids.

The vinyl chloride polymer usually will be the homopolymer of vinyl chloride (often referred to as PVC). When it is a copolymer of vinyl chloride with another comonomer, suitable such other comonomers include, for example ethylene, propylene, vinyl acetate, methyl acrylate, methyl methacrylate, vinyl ethyl ether, etc.

All such monomers which can be copolymerized with ethylene to form copolymer (a) or with vinyl chloride to give polymer (b) are well known and either are available commercially or can be made by known methods from readily available starting materials. Further, suitable copolymers of ethylene with comonomers X and Y and copolymers of vinyl chloride with other comonomers are known, for example, from U.S. Pat. No. 4,613,533 to Statz et al. PVC itself is a well known commercial material.

The preferred amount of copolymer (a) in the blend is 40–90%, and especially 50–75%, based on the total polymer content. The preferred amounts of polymer (b) obviously will be complementary to 100%.

Mica, the third required component of the compositions of the present invention, is not a single chemical compound but rather a member of a group of silicates of varying chemical composition but having similar physical properties and atomic structure. This class of compounds is described in various treatises of inorganic chemistry and is briefly defined in chemical dictionaries, such, e.g., as The Condensed Chemical Dictionary, 7th Edition, Reinhold Book Corporation, New York, 1968. All the members of the mica family have an excellent cleavage and can be split into very thin flexible sheets. All contain hydroxyl, an aluminum silicate group, and an alkali. The usual varieties of mica are muscovite, phlogopite, biotite, lepidolite, and vermiculite. The chemical formula of muscovite corresponds to $2K_2.3Al_2O_3.6SiO_2.2H_2O$; that of phlogopite corresponds to $Mg_3AlSi_3O_{10}$.

In addition to mica, other inorganic fillers, such as, for example, calcium carbonate and aluminum oxide, also can be present, provided the total amount of fillers (including mica) does not exceed about 90 weight percent of the composition.

This invention is now illustrated by the following examples of certain preferred embodiments thereof, wherein all parts, proportions, and percentages are by weight unless otherwise indicated.

EXAMPLES

Examples 1–5

Preparation of blended compositions

Unless otherwise indicated, stabilized PVC is a stabilized composition consisting of 100 parts of PVC (from Conoco), 10 parts of epoxidized soybean oil (Paraplex [TM] G68, Rohm & Haas), 3 parts of a barium-cadmium laurate stabilizer (Mark [TM] WS, Witco), 1 part of an alkyl aryl phosphite stabilizer (Mark [TM] 517, Witco), 0.3 part of dilauryl thiodipropionate (DLTDP from Evans), and 0.1 part of a phenolic antioxidant (Irganox [TM] 1010 from Ciba-Geigy).

About 60 g of a stabilized PVC was fluxed on a 76 mm roll mill at 190° C. To this was added 140 g of an ethylene/n-butyl acrylate/carbon monoxide (E/nBA/CO) 60:30:10 copolymer having a melt index of 7-10 g/10 min, as determined according to ASTM D-1238 with a weight of 2160 g. The material was milled until the blend was homogeneous and all the PVC dissolved in the copolymer. The material was removed from the mill, cooled, and cut into small portions.

This polymer blend (40 g) was again placed on the mill, and 60 g of phlogopite mica (Suzorite, Marietta Resources Int., Ltd.) was added at 190° C. The material was milled until homogeneous, removed from the mill, and compression molded into sheets for tensile strength and RheoVibron tests. The tensile tests were carried out according to ASTM D-638, D-412. A general description of RheoVibron tests can be found in *Experiments in Polymer Science*, E. A. Collins, J. Bares, and F. W. Billmeyer, Jr., Wiley-Interscience, New York (1973), pp. 465–470. The measurements include elastic modulus E', viscous modulus E", and loss tangent (tan δ), which is the ratio E"/E'. E" is the measure of the amount of vibrational energy that is absorbed and converted to heat. Thus, the higher value of E" or tan δ, the greater the absorption of sound or of vibration will be. The experimental details as well as the results obtained are given in Table I later in this text.

Comparative Example 1

The same polymer blend was prepared in the same manner as in Examples 1-5. This was further blended with talc under the conditions employed for blending the polymers with mica in Examples 1-5. This composition was subjected to the same tests, and the results are reported in Table I.

Example 6

A polymer blend of 2727 g stabilized PVC and 6364 g of the same E/nBA/CO copolymer as used in Examples 1-5 was prepared on a bilobal twin screw extruder under the following conditions:

| RPM | Vacuum (kPa) | Temp., °C. Barrel Zones | | | | Die | Melt | Rate kg/hr | Pressure (kPa) |
|---|---|---|---|---|---|---|---|---|---|
| | | 1 | 2 | 3 | 4 | | | | |
| 100 | 91.9 | 143 | 192 | 190 | 191 | 175 | 183 | 7.62 | 869 |

The resulting blend (3632 g) was extrusion compounded with 4249 g of phlogopite mica (Suzorite [TM] HK60, Marietta), 2497 g of phlogopite mica (HK200, Suzorite [TM], Marietta), and 552 g of aromatic processing oil (Sundex [TM], 790³, Sun Oil Co.) under the following conditons:

| RPM | Vacuum (kPa) | Temp., °C. Barrel Zones | | | | Die | Melt | Rate kg/hr | Pressure (kPa) |
|---|---|---|---|---|---|---|---|---|---|
| | | 1 | 2 | 3 | 4 | | | | |
| 100 | None | 154 | 191 | 189 | 192 | 176 | 184 | 5.08 | 917 |

The resulting composition was tested in the same manner as before. The results are given in Table I.

Example 7

Another blend was prepared in the same manner as in Example 6 from 3632 g of polymer blend (same as in Example 6), 2497 g of HK200 mica, 3133 g of HK60 mica, and 454 g of processing oil (Sundex [TM] 790, Sun Oil Co,). This composition also was tested in the same manner, and the results are reported in Table I.

Examples 8 and 9

E/nBA/CO copolymer of the same grade as in Examples 1-5 (41.3 kg) and 19.8 kg of stabilized PVC were mixed together in a Banbury mixer at 177° C. until fluxed (about 10 minutes). The material was placed on a roll mill and made into a sheet. A portion of this sheeted blend (28.6 kg) was placed in the Banbury mixer again along with #1-K mica (dry ground muscovite mica from English Mica Co.) and trioctyl trimellitate (TOTM, Monsanto) in the ratios indicated in Table I. The material was then roll milled into a sheet and granulated. Its properties are given in Table I, below.

TABLE I

| Example | Copolymer | % | % PVC | Filler | % | Additive | % | Tensile Strength Break (MPa) | Elongation % |
|---|---|---|---|---|---|---|---|---|---|
| 1 | E/nBA/CO | 28 | 12 | MICA 1 | 60.0 | | | 4.07 | 56.0 |
| 2 | E/nBA/CO | 21 | 9 | MICA 2 | 70.0 | | | 4.34 | 23.0 |
| 3 | E/nBA/CO | 28 | 12 | MICA 2 | 60.0 | | | 1.86 | 33.0 |
| 4 | E/nBA/CO | 19 | 13 | MICA 3 | 65.0 | TOTM | 3.0 | 5.81 | 21.0 |

TABLE I-continued

| | | | | | | | | | |
|---|---|---|---|---|---|---|---|---|---|
| 5 | E/nBA/CO | 23 | 10 | MICA 3 | 62.0 | TOTM | 4.8 | 4.03 | 22.0 |
| C1 | E/nBA/CO | 21 | 9 | TALC | 70.0 | | | 1.39 | 41.0 |
| C2 | E/VA #1 | 20 | 0 | CaCO3 | 72.5 | OIL A | 7.3 | 1.39 | 41.0 |
| C3 | E/VA #2 | 40 | 0 | MICA 1 | 60.0 | | | 8.27 | 12.0 |
| 6 | E/nBA/CO | 23 | 10 | MICA* | 62.0 | OIL B | 4.8 | 2.78 | 17.7 |
| 7 | E/nBA/CO | 28 | 12 | MICA** | 57.0 | OIL B | 4.8 | 2.33 | 23.7 |
| 8 | E/nBA/CO | 22 | 12 | MICA 3 | 62.0 | TOTM | 3.1 | 4.01 | 81.0 |
| 9 | E/nBA/CO | 21 | 11 | MICA 3 | 65.0 | TOTM | 3.0 | 4.50 | 29.0 |

| | Rheo-Vibron Data: E"(MPa)/Tan δ | | | | | |
|---|---|---|---|---|---|---|
| Example | 20° C. | 40° C. | 60° C. | 80° C. | 100° C. | 120° C. |
| 1 | 40/0.2 | 17/0.16 | 11/0.25 | 10/0.3 | 8.5/0.3 | 7.5/0.35 |
| 2 | 80/0.14 | 44/0.14 | | 27/0.28 | | 18/0.32 |
| 3 | 70/0.14 | 35/0.17 | | 17/0.28 | | 13/0.32 |
| 4 | 38/0.15 | 20/0.16 | 10/0.25 | 7.5/0.25 | 5.5/0.28 | 4.0/0.3 |
| 5 | 20/0.18 | 9.0/0.17 | 4.5/0.28 | 3.5/0.29 | 2.5/0.31 | melts |
| C1 | 20/0.14 | 6.5/0.11 | 4.0/0.14 | 3.2/0.15 | 2.5/0.17 | 2.2/0.18 |
| C2 | 18/0.12 | 8.6/0.15 | 3.0/0.12 | melts | | |
| C3 | 24/0.15 | 20/0.07 | 8.6/0.08 | melts | | |
| 6 | 15/0.20 | 5.0/0.15 | 2.5/0.24 | 1.8/0.26 | 1.4/0.30 | melts |
| 7 | 12/0.20 | 4.3/0.15 | 1.8/0.25 | 1.5/0.3 | 1.2/0.35 | melts |
| 8 | | | | | | |
| 9 | | | | | | |

E/nBA/CO = terpolymer of ethylene with n-butyl acrylate and CO, 60:30:10
EVA #1 = blend of 2.5% of a copolymer of ethylene and vinyl acetate, 67:33, melt index 38–48, with 17.5% of a copolymer of ethylene and vinyl acetate, 82:18, melt index 0.7
EVA #2 = copolymer of ethylene with vinyl acetate, 82:18, melt index 2.2–2.8
MICA 1 = "HK200" Suzorite phlogopite mica, Mariette Resources, Int., Ltd.
MICA 2 = "HK60" Suzorite, as above
MICA 3 = "1K" dry ground muscovite mica, English Mica Co.
*23% MICA 1 + 39% MICA 2
**26% MICA 1 + 31% MICA 2
TOTM = Trioctyl trimellitate
OIL A = "Sundex oil 790", aromatic processing oil
OIL B = "Circosol 4240", aromatic processing oil It can be seen from a comparison of Example 1 with Example C3 (Comparative Example 3) that a blend of PVC with an E/nBA/CO copolymer gives at all test temperatures a higher E" and tan δ than a system based on an E/VA copolymer. The composition of the present invention is useful also at much higher temperatures than 140° C.

Comparison of Examples 2 and 3 with Example C1 shows that mica gives superior results than talc in the same polymer system.

Comparison of Example 2 with Example C2, representative of currently used commercial composition, shows superior E", tan δ, and tensile strength and improved upper use temperature for the material of the present invention.

Examples 4–9 further illustrate the invention, including the use of various optional additives and preparation by different processes.

NOISE REDUCTION MEASUREMENTS

Noise reduction measurements were made on samples using a random noise generator. This random noise was directed through a duct having a square cross-section of 305×305 mm, terminated by an acoustic absorber. The noise reduction is expressed as NR=$L_1-L_2$, where $L_1$ and $L_2$, expressed in dB, are the noise levels on opposite sides of the samples. The values of $L_1$ and $L_2$ were measured in eight octave bands from 63 to 8000 Hz by means of two Octave Band Analyzers (General Radio, Type 1933).

The effectiveness of noise reduction is a function of both NR and the surface density of the sample, thin, light samples absorbing less sound than thicker, heavier samples of the same composition.

Sheets of the material were prepared and tested as shown in Table II, below. Table II gives the values of noise reduction (decibels) as a function of frequency for the following examples.

TABLE II

| | Noise Reduction* | | | | |
|---|---|---|---|---|---|
| Frequency Hz | Example 10 | Example 11 | Example 12 | Comparative Example 4 | Comparative Example 5 |
| 63 | 15 | 14 | 16 | 14 | 22 |
| 125 | 22 | 21 | 20 | 17 | 20 |
| 250 | 23 | 22 | 23 | 22 | 22 |
| 500 | 26 | 25 | 27 | 24 | 26 |
| 1000 | 27 | 28 | 28 | 27 | 26 |
| 2000 | 29 | 29 | 30 | 27.5 | 27 |
| 4000 | 31 | 30 | 32 | 30 | 27.5 |
| 8000 | 33 | 37 | 35 | 35.5 | 27 |
| Avg. | 25.8 | 26.8 | 26.4 | 22.1 | 24.7 |
| Composition | Same as Example 6 | Same as Example 7 | Same as Example 1 | 20.5% EVA (25% VA, melt index = 2) 7.0% OIL A 72.5% CaCO3 | Plywood |
| Thickness | 3.2 | 3.2 | 3.2 | 2.5 | 6.4 |

TABLE II-continued

| Frequency Hz | Noise Reduction* | | | | |
|---|---|---|---|---|---|
| | Example 10 | Example 11 | Example 12 | Comparative Example 4 | Comparative Example 5 |
| (mm/approx.) Surface Density (kg/m$^2$) | 5.13 | 4.88 | 5.13 | 3.56 | 4.34 |

*in dB

It can be seen that the compositions of the present invention containing about 57 to 62% of mica were as effective in sound deadening as a prior art composition (C4, Comparative Example 4) containing 72.5% of calcium carbonate. Based on the weight of filler, the compositions of the present invention thus have better sound deadening properties.

LOW TEMPERATURE PROPERTIES

Example 12 and Comparative Examples 6 and 7

Compositions containing PVC, ethylene copolymer, and mica in the respective ratios of 10:40:50 were prepared by the above-described techniques. The ethylene copolymer had the following compositions:

| Example | Ethylene Copolymer |
|---|---|
| 12 | E/nBA/CO, 60:30:10 |
| C6 | E/VA/CO, 62:28:10 |
| C7 | E/VA, 32:68 |

PVC was a formulation containing 100 parts of PVC, 10 parts of epoxidized soybean oil (Paraplex [TM] G68, Rohm & Haas), 3 parts of Ba-Cd laurate stabilizer (Mark [TM] WS, Witco), 1 part of an alkyl aryl phosphite stabilizer (Mark [TM] 517, Witco), 1.8 parts of dilauryl thiodipropionate, and 0.7 parts of an antioxidant (Irganox [TM] 1010, Ciba-Geigy). Mica was the HK200 type.

The torsion modulus of each one of these samples was measured at room temperature and at a low temperature ($-10°$ C. and/or $0°$ C.), according to ASTM D-1043. The results of these measurements are given in Table III, below.

TABLE III

| | TORSION MODULUS (MPa) AS A FUNCTION OF TEMPERATURE | | |
|---|---|---|---|
| Example | 23° C. | 0° C. | −10° C. |
| 12 | 19 | 36 | 81 |
| C6 | 33 | 108 | — |
| C7 | 12 | 39 | 429 |

The table shows that the composition of the present invention (Example 12) has far superior low temperature properties when compared to materials made from E/VA copolymer having high vinyl acetate content. The compositions of the present invention remain much more flexible at low temperatures and would thus be expected to be able to retain to a higher degree the ability to dampen vibration and absorb sound at low temperatures.

Examples 13 and 14 and Comparative Examples C8–C11

The following polymer composition was prepared. First, PVC was compounded as follows:

| | Pts. |
|---|---|
| Geon 30 (TM) PVC (B. F. Goodrich) | 100 |
| Drapex 6.8 (TM) epoxidized soybean oil (Witco) | 15 |
| Phosphite PVC stabilizer | 1 |
| Ca/Zn PVC stabilizer | 3 |
| Stearic acid | 0.25 |
| Antioxidant (Irganox [TM] 1010 Ciba-Geigy) | 1 |

This composition, 35 g, was melt-blended with 65 g of an E/nBA/CO 60:30:10 copolymer to give a compatible blend, which then was used in the tests. The test compositions as well as the Rheo Vibron data are given below in Table IV.

TABLE IV

| Example | Filler, | % | Rheo Vibron Date E''/Tan δ | | | | |
|---|---|---|---|---|---|---|---|
| | | | 20° C. | 40° C. | 60° C. | 80° C. | 100° C. |
| 13 | Mica* | 75 | 25/0.16 | 15/0.16 | 11/0.2 | 10/0.2 | 9/0.2 |
| 14 | Mica* | 50 | 19/0.2 | 7/0.12 | 4/0.18 | 4/0.22 | 4/0.24 |
| C8 | CaCO$_3$ | 75 | 1.3/0.11 | 0.4/0.22 | 0.6/0.11 | 0.3/0.26 | 0.2/0.3 |
| C9 | CaCO$_3$ | 50 | 4.0/0.2 | 1.4/0.12 | 1/0.13 | 0.9/0.19 | 0.8/0.22 |
| C10 | BaSO$_4$ | 75 | 0.7/0.11 | 0.4/0.1 | 0.3/0.15 | 0.3/0.2 | 0.2/0.22 |
| C11 | BaSO$_4$ | 50 | 1.5/0.2 | 0.5/0.1 | 0.35/0.18 | 0.3/0.2 | 0.3/0.25 |

Mica* = Suzorite phlogopite mica

The above data show that the polymer compositions using mica as the filler have much higher values of E''/tan δ over the test temperature range than comparable prior art compositions containing either calcium carbonate or barium sulfate. Accordingly, the mica-containing compositions can be expected to provide much better sound absorption.

I claim:

1. A composition suitable for the manufacture of noise reduction or vibration damping articles, said composition consisting essentially of a blend of
    (a) about 10–90% of a copolymer of ethylene with at least one organic monomer X capable of being polymerized to a homopolymer having a glass transition temperature, T$_g$, of less than about −20° C. and selected from the group consisting of esters of unsaturated C$_3$–C$_{20}$ mono- and dicarboxylic acids, vinyl esters of saturated C$_2$–C$_{18}$ carboxylic acids, and vinyl alkyl ethers wherein the alkyl group has 1–18 carbon atoms, and an additional monomer Y selected from the group consisting of ethylenically unsaturated $C_3$-$C_{20}$ carboxylic acids, carbon monoxide, and sulfur dioxide;
(b) about 90-10% of a vinyl chloride homopolymer or a copolymer of vinyl chloride with another ethylenically unsaturated comonomer selected from the group consisting of $C_2$-$C_5$ hydrocarbons, vinyl esters, acrylonitrile, acrylic esters, vinylidene chloride, esters of unsaturated carboxylic acids, and vinyl ethers;
both percentages being based on the total weight of the polymers in the blend, which is about 10-80% of the total weight of the composition; and
(c) about 20-90% of mica, based on the total weight of the composition.

2. A composition of claim 1 wherein monomer X is an acrylate ester.

3. A composition of claim 2 wherein monomer Y is carbon monoxide.

4. A composition of claim 1 wherein monomer X is n-butyl acrylate, and monomer Y is carbon monoxide.

5. A composition of claim 1 wherein the range of monomer X in the ethylene copolymer is about 1-60 weight %.

6. A composition of claim 5 wherein the range of monomer X in the ethylene copolymer is 5-60 weight %.

7. A composition of claim 6 wherein the range of monomer X is 5-50 weight %.

8. A composition of claim 1 wherein the range of monomer Y is about 1-30 weight %.

9. A composition of claim 8 wherein the range of monomer Y is 3-30 weight%.

10. A composition of claim 9 wherein the range of monomer Y is 3-10 weight %.

11. A composition of claim 1 wherein mica is phlogopite.

12. A composition of claim 1 wherein polymer (b) is polyvinyl chloride.

13. A composition of claim 1 wherein, in addition to mica, there also is present in the composition at least one other inorganic filler, the total amount of mica plus the other organic filler material being at most 90 weight % of the composition.

14. A composition of claim 1 wherein the amount of copolymer of ethylene copolymer (a) in the blend is 40-90%, and the amount of vinyl chloride homopolymer or copolymer (b) is 60-10%, both being based on the total weight of polymers in the blend.

15. A composition of claim 14, wherein the amount of copolymer of ethylene (a) is 50-75%, and the amount of vinyl chloride homopolymer or copolymer (b) is 50-25%, both being based on the total weight of the polymers in the blend.

16. A composition of claim 15 wherein monomer X is an acrylate ester.

17. A composition of claim 16 wherein monomer Y is carbon monoxide.

18. A composition of claim 17 wherein wherein monomer X is n-butyl acrylate.

19. A composition of claim 15 wherein monomer Y is carbon monoxide.

20. A composition of claim 15 wherein polymer (b) is polyvinyl chloride.

* * * * *